United States Patent
Belschner et al.

(10) Patent No.: US 7,103,805 B2
(45) Date of Patent: Sep. 5, 2006

(54) BUS MONITOR UNIT

(75) Inventors: Ralf Belschner, Pliezhausen (DE); Bernd Hedenetz, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 463 days.

(21) Appl. No.: 10/255,087

(22) Filed: Sep. 26, 2002

(65) Prior Publication Data

US 2003/0093727 A1    May 15, 2003

(30) Foreign Application Priority Data

Sep. 29, 2001 (DE) ............................ 101 48 325

(51) Int. Cl.
*G06F 11/00* (2006.01)
(52) U.S. Cl. .................... 714/43; 714/4; 714/56
(58) Field of Classification Search ............. 714/43, 714/47, 55, 56; 370/221; 710/117, 124; 709/252
See application file for complete search history.

(56) References Cited

U.S. PATENT DOCUMENTS

| | | | | |
|---|---|---|---|---|
| 4,281,380 A | * | 7/1981 | DeMesa et al. | 710/119 |
| 4,412,280 A | | 10/1983 | Murphy et al. | 364/200 |
| 5,499,247 A | * | 3/1996 | Matsuda et al. | 370/445 |
| 5,864,653 A | | 1/1999 | Tavallaei et al. | 315/181 |
| 5,951,664 A | * | 9/1999 | Lambrecht et al. | 710/124 |
| 6,147,967 A | | 11/2000 | Ying et al. | 370/222 |
| 6,353,615 B1 | * | 3/2002 | Bohne | 370/442 |
| 2003/0067873 A1 | * | 4/2003 | Fuhrmann et al. | 370/230 |
| 2004/0030949 A1 | * | 2/2004 | Kopetz et al. | 714/4 |

FOREIGN PATENT DOCUMENTS

| | | |
|---|---|---|
| DE | 3137046 | 4/1982 |
| DE | 37 26 742 A1 | 8/1987 |
| DE | 19643092 | 4/1998 |
| DE | 69223428 T2 | 6/1998 |
| DE | 19922561 | 11/2000 |
| WO | WO01/1320 A1 | 6/2000 |

OTHER PUBLICATIONS

Temple. "Avoiding the Babbling-Idiot Failure in a Time-Triggered Communication System." 28th International Symposium on FTCS, Jun. 1998, Munchen, Germany.*

Bauer et al. "A Centralized Approach for Avoiding the Babbling-Idiot Failure in the Time-Triggered Architecture." ICDSN, New York, NY, USA, Jun. 2000.*

(Continued)

*Primary Examiner*—Robert Beausoliel
*Assistant Examiner*—Philip Guyton
(74) *Attorney, Agent, or Firm*—Crowell & Moring LLP

(57) ABSTRACT

A central node for a data bus system includes a bus monitor unit with receiver means for registering signals on the data bus, and evaluation means which detect incorrect communication on the data bus and at least temporarily block communication by the user that causes the incorrect communication or compensate the incorrect communication of a user which is triggered by the interference influences. The bus monitor unit includes timing means which are triggered according to time patterns for the transmission of each user of the data bus, in order to detect an incorrect communication of a user if the latter transmits outside the time provided for it. The bus monitor unit is integrated into the central bus node and a plurality of bus branches of different users are combined at the central node so that the bus monitor unit can check a plurality of users for incorrect communication. In order to increase reliability, in addition to the bus monitor unit, a diagnostic unit is integrated into the central node. The latter monitors the bus monitor unit in terms of regular retriggering in response to the time patterns, so that the bus monitor unit can be deactivated in the absence of retriggering.

19 Claims, 3 Drawing Sheets

OTHER PUBLICATIONS

PCT publication WO 01/30028.*

Kopetz et al. "Tolerating Arbitrary Node Failures in the Time-Triggered Architecture." SAE 2001 World Congress, Mar. 2001, Detroit, MI.*

Steiner et al. "The Transition from Asynchronous to Synchronous system Operation: An Approach for Distributed Fault-Tolerant Systems (Including Simulation)." Institut Technische Informatik, Vienna, Austria. 2001.*

* cited by examiner

BUS MONITOR UNIT

BACKGROUND AND SUMMARY OF THE INVENTION

This application claims the priority of 101 48 325.2, filed 29 Sep. 2001, the disclosure of which is expressly incorporated by reference herein.

The invention relates to a central node for a data bus system having a bus monitor unit with a receiver for registering the signals on the data bus, and evaluation means which detect a faulty communication on the data bus, and at least temporarily block communication by the user causing the faulty communication, or compensate an incorrect communication that is triggered by interference influences. The bus monitor unit has timing means which are triggered in response to time patterns of the data bus for the transmission of each user, and detect a faulty communication when a user transmits outside the time patterns provided for it. The bus monitor unit is integrated into the central bus node and a plurality of bus branches of different users are combined at the central node so that the bus monitor unit can check a plurality of users for incorrect communication.

In contemporary means of transportation such as motor vehicles, trucks and aircraft, data bus systems are used for transmitting data between individual users, such as controllers, sensors and actuators. For this purpose, asynchronous data bus systems (for example the CAN bus) are used, in which messages are transmitted by the users as they occur. In addition, synchronous data buses are used in which each user is allocated one or more time slots in which it can transmit. The advantage of the latter data buses is that message collisions cannot occur when the system is functioning correctly. Time slots for transmission are assigned to each user by means of what are referred to as time patterns, and all the users on the data bus synchronize themselves with such a pattern, being able to transmit only in the time slot provided for them. The reception of messages is independent of this and the messages provided for each user are received at any time. Modern data buses, for example the MOST or the FlexRay data bus, have both synchronous and asynchronous phases.

In such data buses, communications faults may occur for different reasons. For example, a subscriber transmits on the data bus outside the time slot provided for it, in which case messages to be received are disrupted and a collision with other transmitted messages occurs. In order to block such incorrect communications on the data bus, or to compensate for the interference influences, bus monitor units are provided which are triggered in response to the time patterns of the data bus for the transmission of a user in order to detect an incorrect communication of a user when it transmits outside the time patterns provided for it.

German patent document DE 37 26 742 A1 discloses a bus monitor unit which intervenes in a user line between a user and data bus and interrupts it by means of two switches when a malfunction of the user occurs. Such a decentralized bus monitor unit is assigned to each of the individual users, so that each requires its own bus monitor unit which switches it off when a malfunction is detected. In data bus systems with up to 60 control units per vehicle and other sensors which are connected directly to the data bus, this gives rise to a situation in which a considerable number of bus monitor units, each assigned to the user, are provided within the means of transportation.

International patent document WO 01/13230 A1 discloses a method for blocking a user when incorrect communication occurs. For this purpose, "distributor units" are provided which, depending on the known customary transmission behavior of the users, permit transmission only within the statically assigned time slots. These distributor units, which are provided separately from the users and have a central bus monitor unit, observe one another mutually with respect to their functions and also carry out clock synchronization in order to synchronize with the time patterns of the data bus system. Each of the two disclosed distributor units has an integrated bus monitor unit. Each bus monitor unit forcibly causes each user to transmit to the other users only within its statically assigned time slots, based on its known transmission behavior. For this purpose, a time-registering means is provided which registers the time patterns of the data bus for the transmission of a user and, triggered by these time patterns, assigns a transmission slot to each user. Each distributor unit is connected via further communication channels, which are not associated with the data bus, to an external maintenance computer which can determine the parameters of the distributor unit and continuously monitors the correct functioning of the distributor unit. For comprehensive diagnostics, the external maintenance computer requires additional time-registering means which are again synchronized with the time patterns. As a result, the maintenance computer is either complex and expensive or carries out only an impoverished level of diagnostics.

One object of the present invention is therefore to provide a bus monitor unit of the type described above, whose correct functioning can be monitored during its operation, and can be quickly switched off in the event of a malfunction. This should be possible especially if the data communication outside the central node has partially collapsed.

This and other objects and advantages are achieved by the apparatus according to the invention, which includes in addition to the bus monitor unit, a diagnostic unit that is integrated into the central node. The diagnostic unit monitors the regular retriggering of the bus monitor unit in response to the time patterns, so that the bus monitor unit can be deactivated in the absence of retriggering. Alternatively, or in addition, it is possible to provide a configuration means (in addition to the bus monitor unit in the central node) for configuring the communication for each user in accordance with a configuration list stored in the central node so that, in the event of a fault, further communication of each user is either released or blocked individually.

The bus monitor unit which is integrated into the central node is suitable for monitoring access of users to the data bus, without having to install the bus monitor unit in a decentralized controller for this purpose. The central bus monitor unit and the diagnostic unit can be used to prevent faulty access to the data bus by a user (for example of a controller). It is possible to use the central node as a stand-alone unit encapsulated within a housing with self-diagnostics in the means of transportation. The central node is equipped with an integrated diagnostic unit without connecting lines for that purpose, which run in the vehicle and can create EMC problems as the result of external electromagnetic sources. In particular, the electronics of a decentralized data bus user (for example a controller) can also be integrated into the central node, so that the necessary hardware is available for the diagnostic computer.

As the bus monitor unit is integrated into the central node, its clock synchronization unit (which is already present) can be used as a time-registering means. Also, by virtue of the integration of the bus monitor and the diagnostic unit, there is no need for a separate communications network between the central node and the diagnostics unit, such as is necessary in other systems. Because of the integrated diagnostic unit, onboard diagnostics takes place in the central bus node, which in turn makes the latter particularly failsafe.

Sequential data slots in which users (i.e., a central or decentralized node) transmits are provided on the data bus. At the start of each new time slot, a trigger signal is generated by the time-registering means, and the time patterns defined by the trigger signals are made available to the bus monitor unit and to the diagnostic unit. The bus monitor unit can therefore check the communications data transmitted by a user to determine whether the transmission data occurs in the correct time slot.

Based on the second time pattern made available to it, the diagnostic unit checks whether the bus monitor unit regularly retriggers in response to the time patterns by means of the trigger signals (that is, whether it is appropriately retriggered at the start of each time slot). In this manner, the diagnostic unit checks the operation the bus monitor unit arranged within the same central node, and blocks it when there is a malfunction (for example, in the absence of retriggering). This is necessary because a malfunction of the bus monitor unit in the central node (especially incorrectly timed triggering) can result in complete blocking of the transmission signals on the data bus.

For this reason, according to the invention, both the bus monitor unit and the bus monitor diagnostic unit are integrated centrally into the central node. As a result, the chronological monitoring of the bus monitor unit functions very well owing due to the spatial proximity. On the other hand, however, it is also possible to achieve savings in terms of separate time-registering means which are necessary when there is a diagnostic unit that is arranged separately from the node. The central node with the integrated diagnostic unit therefore forms a closed system which preferably also has fault-handling routines, so that the central node is operationally capable independently of external diagnostic units, and has its own fault detection means.

The diagnostic unit has a watchdog connected to the time-registering means, that receives the signals for regular retriggering of the bus monitor unit and is connected via a control line to the bus monitor in order to switch it off in the absence of retriggering. The bus monitor unit is triggered periodically (i.e., retriggered) to carry out its monitoring function synchronously with the cyclical time patterns. The trigger signals are generated on the data bus by means of a clock synchronization unit. Such triggering is checked by the time-registering means or the diagnostic unit, and is used in the bus monitor unit for switching off in the case of malfunctions of the users, and in the watchdog for monitoring the bus monitor unit. Alternatively, the trigger signal can also originate from different time-registering means.

The bus monitor unit can be activated by an external signal or a signal of a configuration means. Before the bus monitor unit is activated, each user can transmit. On the other hand, the configuration means can switch the bus monitor unit switched to an inactive state in particular time periods, so that all the users can transmit. In this phase, it is possible, for example, for asynchronous communication to take place on the data bus, with no time patterns allotted to the individual users. After the asynchronous phase, the bus monitor unit is again switched to the active state to monitor the synchronous time behavior during the transmission of the individual users.

The watchdog preferably makes direct use of the stored time patterns of the configuration means again. It is connected to the time-registering means, and receives the signals for regularly retriggering the bus monitor unit. The time patterns which are accessed by the watchdog and the bus monitor unit can be configured using the configuration means, in particular when the data bus is powered up. Here, retrigger times for the bus monitor unit are defined, and intervals for asynchronous data transmission without monitoring by the bus monitor unit are determined. The synchronization of the bus monitor unit and the trigger signal for the watchdog can be derived from an identical trigger signal. This trigger signal is made available by the time-registering means.

The watchdog monitors the cyclical synchronization of the bus monitor unit with the time patterns of the data bus, and switches the bus monitor unit to an inactive state when the trigger signal fails to occur, blocking or releasing the communication in a way which can be configured for all the users. At the same time, a fault message of the watchdog is output to a control unit (for example on a display of the vehicle), in order to signal a fault condition. If the synchronization or retriggering of the bus monitor unit was faulty for a specific time, the watchdog can block it for a specific time and initiate a fault-handling routine of the diagnostic unit. The diagnostic, information can also be transmitted by a diagnostic computer to a control center or workshop.

The configuration means, which is also integrated into the central node, predetermines the time patterns of the data bus, so that the bus monitor detects the chronological sequences during the transmission operations of the different users. The time patterns of the configuration means are taken into account in particular when the data bus system is powered up, and are made available to the watchdog for the monitoring of the bus monitor unit.

The central node and the bus monitor unit, together with the diagnostic unit, are provided in a node computer housing, so that the central node may be used as a stand-alone version. For this purpose, the central node is configured as an intelligent unit which independently detects, and handles, faulty synchronization of the bus monitor unit. Faulty behavior of the central node does not disrupt of other communications channels.

A faulty node or user is temporarily switched to a passive state (in terms of communication technology) and can participate actively in the communication again after, for example, a restart or a configurable time interval. The time patterns, for the data bus can be configured flexibly, using the integrated configuration means. Because the configuration means is connected to the diagnostic device within a housing, only one time-registering means is necessary for the central node with bus monitor unit, watchdog and diagnostic unit. This provides an intelligent central node which is compact and can be used as stand-alone unit. By virtue of the integration of the configuration means, the start-up behavior is independent of the communications protocol, and the start-up is speeded up and occurs with a performance comparable to that of the communications protocol start-up.

The bus monitor unit is connected via an interface to a communications computer of the central node, which loads and calculates the time patterns for the accepted transmission slots of the individual users. The interface is a component of the configuration means, which itself can in turn be configured as a user of the data bus, with receiver and transmitter units for connecting to the data bus. Consequently, as a user of the data bus, the configuration means can also be provided with information on the time pattern via the data bus itself. This also makes possible a download or flash procedure in which software is transmitted from an external control center onto the data bus of the vehicle in order to provide new time patterns. In this manner, it is also possible to download the necessary new time pattern onto the data bus system by means of a software download, even when manufacturing the vehicle or when equipping it with a further controller.

The watchdog is preferably a component of a time-registering unit within the central node. The watchdog checks the cyclical synchronization of the bus monitor unit with respect to the provided time patterns, and generates a fault message when the synchronization by means of the respective trigger signals does not occur. Moreover, when there is a fault message, the watchdog can block the bus monitor unit from intervening in the bus communication.

In terms of the topology, the data bus with the central node can have a star shape or cascaded star shape. In a data bus with a cascaded star shape, two star nodes are arranged in direct connection with one another, and a data bus line is provided for the exchange of signals between the star nodes. In contrast to International patent document WO 01/13230, in which a unidirectional line is provided between the star couplers, the data bus line between the star couplers is of a bidirectional design here as in the customary data bus. In this way, two star-shaped data bus systems can communicate with one another via the star couplers.

The central bus node can also be embodied as a gateway, which can connect two different bus systems to one another. In this case, the data bus signals of one data bus in the central node are converted into the messages of the other data bus system. There is also provision for various time patterns in each of the different data bus systems, so that the bus monitor unit can monitor two different time patterns, and the watchdog checks the correct functioning of the bus monitor unit with respect to the two different time patterns.

The central node according to the present invention has the advantage that a star coupler, the bus monitor unit, the diagnostic unit and, if appropriate, the configuration means for the time patterns are arranged within an independently acting central node and within a housing. A flexible configuration of the time patterns can be carried out by means of an input unit on the central node. Likewise, the diagnostics are integrated into the intelligent central node, enabling particularly effective fault detection to be carried out on the time patterns.

In one embodiment, for example, a bus driver can either transmit or receive at one time. (That is, only the transmitter or the receiver in a driver can ever be connected through to the data bus.) The activation of the transmission/reception switches can be carried out in the user itself on the basis of signal activity on the bus line. If a bus driver detects activity on the external bus line, it transmits this signal to the other users via the star point of the central node. Alternatively, the bus monitor unit can release the communications path for each user.

The blocking function of the switches must be periodically checked in order to prevent concealed faults. This can be done by monitoring the activity on the data bus. If there is activity at a time when the switch should be released, the switch is defective. This method permits rapid and detailed diagnostics to be performed on the star coupler.

Other objects, advantages and novel features of the present invention will become apparent from the following detailed description of the invention when considered in conjunction with the accompanying drawings.

DETAILED DESCRIPTION OF THE DRAWINGS

Figure 1:
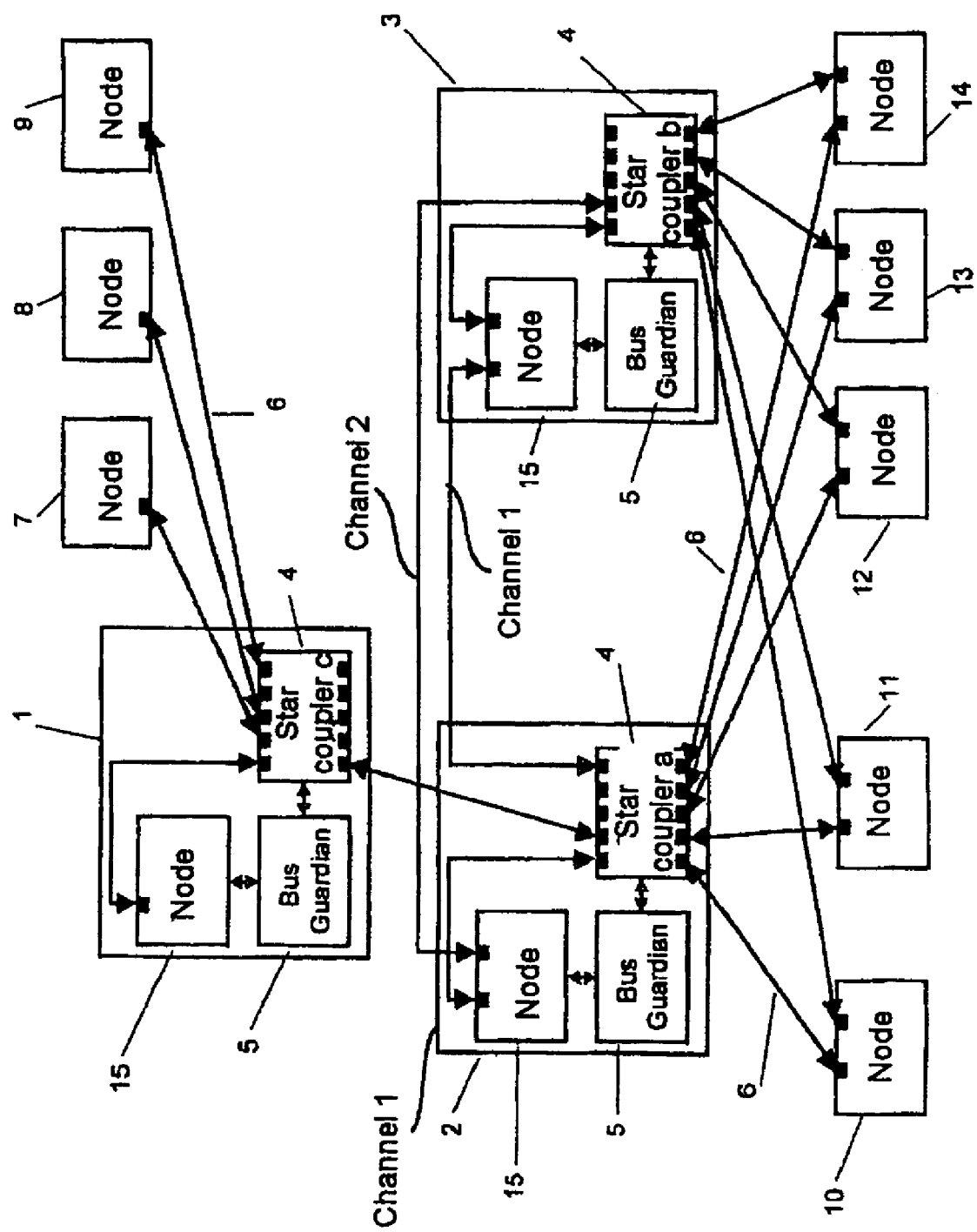
FIG. 1 shows an example of a topology for a data bus system according to the invention, with cascaded star networks and central star nodes.

FIG. 1 shows a data bus system with three cascaded central nodes 1, 2 and 3. Each central node 1, 2, 3 has a star coupler 4 by which data bus branches 6 are connected to various remote users 7–14 in a star shape. The users (remote nodes 7–14) are, for example, controllers or sensors or actuators which are connected directly to the data bus branches 6. Each central node 1, 2, 3 has, in addition to the star coupler 4, a bus monitor unit 5 which checks the transmission behavior of the users 7–14 relative to a predefined timing pattern. Each of the users 7–14 is assigned a time slot in which it is intended to transmit. The bus monitor 5 in each central node 1–3 monitors the communications activity across the star coupler 4 and blocks communication of a user 7–14 in particular if the user 7–14 attempts to transmit outside its time slot. In addition, each central node 1, 2, 3 has a diagnostic and/or configurations computer 15 by which it can be configured, and can be checked for a faulty bus monitor unit 5.

Figure 2:
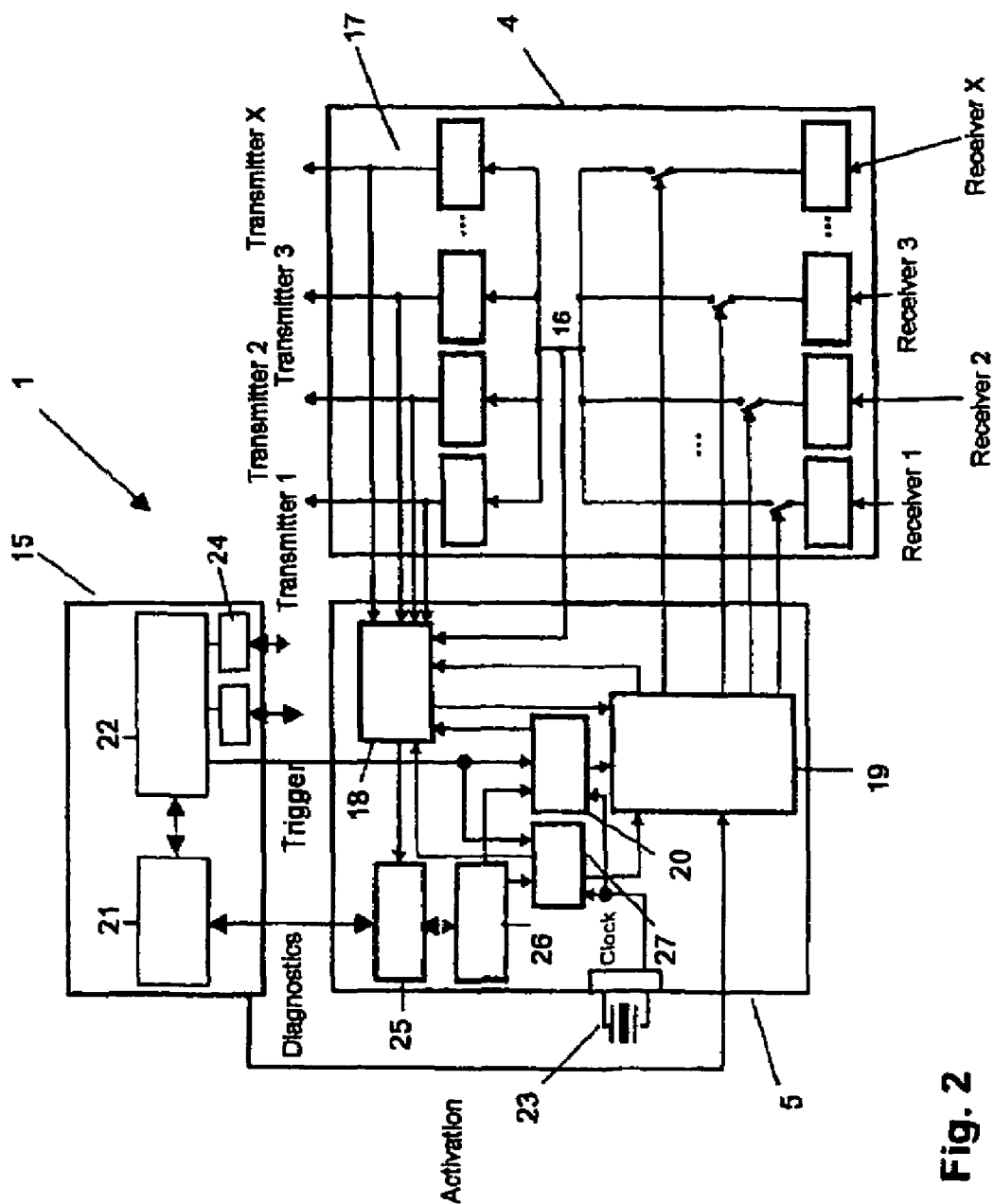
FIG. 2 is a view which shows the central node according to the present invention with bus monitor unit and diagnostic unit.

In FIG. 2 the central node 1 is illustrated with the star coupler 4 and the bus monitor unit 5, together with the integrated configuration and/or diagnostic unit 15. The star coupler 4 has transmitters 1, 2 up to transmitter X and receivers 1, 2 up to receiver X, for connecting to the users 7–14 via the bus data branches 6. The bus monitor unit 5 taps the respective transmission signals at the star point 16 and on the individual bus lines 17, and provides such transmission signals to a computing unit 18. If the transmission signals of the users 7–14 are determined to correspond to the time patterns provided for the data bus, the respective bus lines 6, 17 of the star coupler 4 are released by means of the release unit 19. The watchdog 20, which checks whether the bus monitor unit 5, in particular its computing unit 18, is triggered by means of cyclically recurring trigger signals, is connected directly to the bus monitor unit 5, and in particular to the computing unit 18.

The trigger signals are calculated from the predefined time patterns which can be set using the configuration means 15 and configuration parameters 21. The time patterns, which are predetermined by a unit 21 for setting the configuration parameters, are correspondingly evaluated by means of a communications controller 22, and evaluated by means of a clock signal 23 which is also available to the star coupler 4 and the bus monitor unit 5, in order to generate trigger signals. The communications controller 22 can also be connected directly again to the data bus 6 or to the star couplers 2 and 3 by means of a separate transceiver with transmitter and receiver unit 24.

The bus monitor unit 5 not only has a unit for access protection 25 but also a separate memory for the configured time patterns 26, and a sequencing control means 27 which is connected to the system clock 23 and which synchronizes the watchdog 20. The latter monitors the bus monitor unit 5 and registers the retrigger signals. A faulty state of the bus monitor unit 5 is detected at least when the retrigger signals of the communications controller 22 fail to occur.

Figure 3:
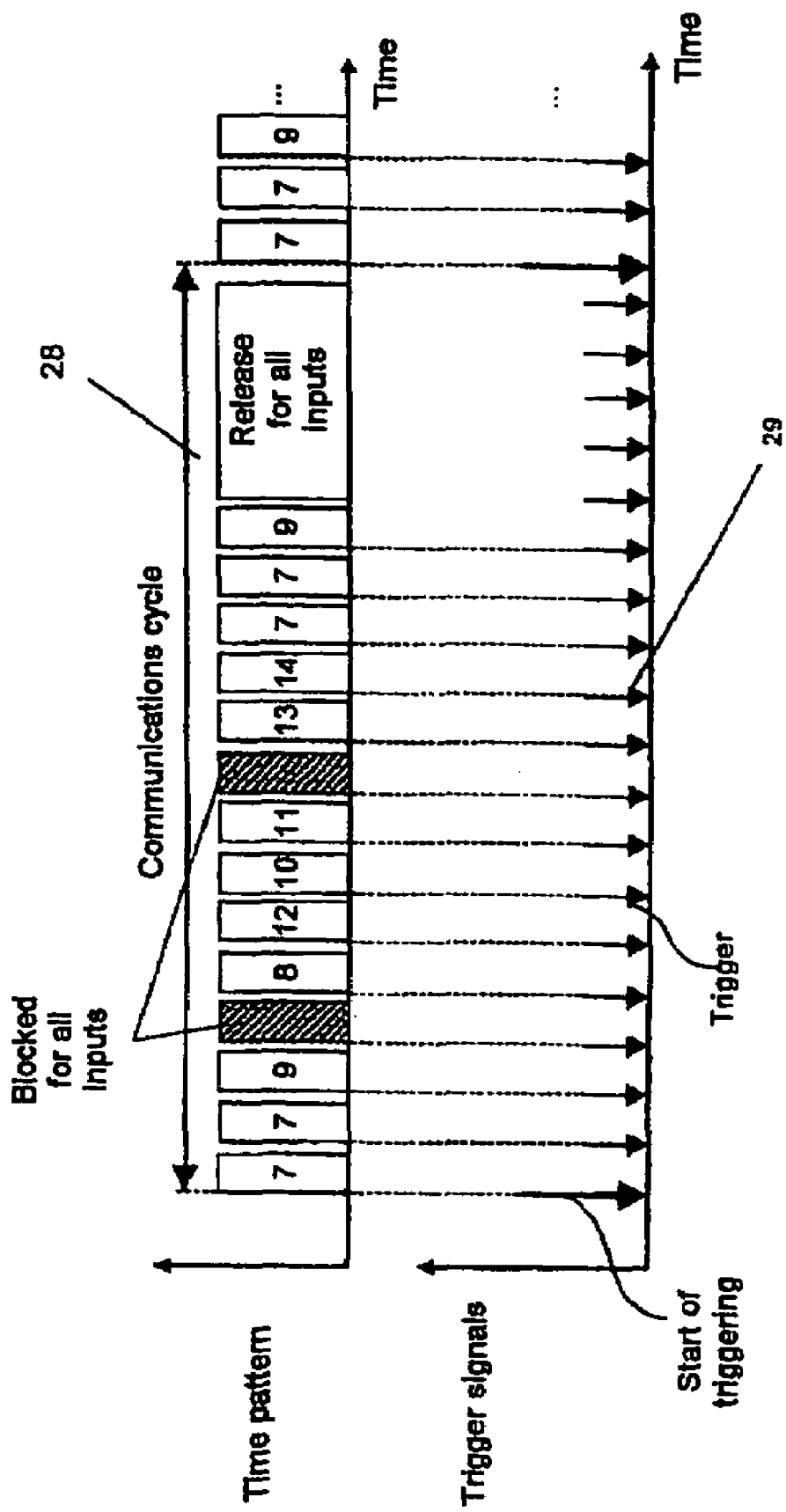
FIG. 3 shows a time pattern for the sequential transmission on a data bus with the trigger signals for the central bus monitor unit with a time period in which the entire bus communication is blocked.

FIG. 3 shows an example of a time pattern such as can be determined by the unit for setting the configuration parameters 21. First, two time slots are provided for the user 7, followed by a time slot for the third user 9. The two time slots which are represented in a hatched form are marked as blocked by the hatching, i.e. the bus monitor unit 5 has detected a faulty transmission signal at this time; as a result, the time slot is blocked both for transmission and reception. However, on the other hand, it would also be possible for signal filtering to take place so that the correct signal is generated by means of a filter or a redundant channel. The time slots can either be blocked selectively for only one user on the star coupler 1, or else for all the users 7–14.

Between the two blocked signal slots, time slots are again provided for the users 8, 12, 10 and 11, and finally further time slots are provided for the other users 7–14. During the time pattern 28, the bus monitor unit 5 is switched to the inactive state so that at this time asynchronous transmission can take place via the data bus 6, as is provided for example with the data bus FlexRay.

Thereafter, the time pattern monitored by the bus monitor unit 5 starts cyclically again from the beginning. Trigger pulses which are designated by 29 and which are each made available at the start of a time slot by the communications controller 22 are illustrated in the lower diagram. These trigger pulses 29 are made available, on the one hand, to the watchdog 20 and to the arithmetic unit 18 for the bus monitor unit 5 in order to monitor for correctness the data communication across the star coupler 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A central node for a data bus system having a bus monitor unit with receiver means for registering signals on the data bus, and evaluation means for at least temporarily blocking communication by a bus user which causes faulty communication on the bus, or for compensating a faulty communication that is triggered by interference influences, wherein:
   the bus monitor unit has timing means which are triggered according to time patterns for transmission by each user of the data bus, to detect a faulty communication of a particular user if the particular user transmits outside a time provided for it;
   the bus monitor unit is integrated into the central node;
   a plurality of bus branches of different users are combined at the central node, so that the bus monitor unit can check a plurality of users for incorrect communication;
   in addition to the bus monitor unit the central node has integrated therein,
      a diagnostic unit that monitors regularity of retriggering of the bus monitor unit according to the time patterns, whereby the bus monitor unit can be deactivated in the absence of retriggering; and
      a configuration means for configuring the communication for each user in accordance with a provided configuration list, whereby, in the event of a fault, each user is either released or blocked to further communication;
   the time patterns for transmission on the data bus are settable via the central node, to trigger the bus monitor unit in response to the various transmission slots for the users on the data bus;
   the diagnostic unit includes means for intermittently switching the bus monitor from an active state to an inactive state in particular time periods, to permit asynchronous communication on the data bus during such time periods.

2. The apparatus according to claim 1, wherein:
   the diagnostic unit includes a watchdog which is connected to the timing means, and to which signals for regular retriggering of the bus monitor unit are fed;
   the watchdog is connected via a control line to the bus monitor unit and blocks its operation in the absence of retriggering.

3. The apparatus according to claim 1, wherein the bus monitor is integrated in a node computer housing, together with the central node and the diagnostic unit.

4. The apparatus according to claim 1, wherein:
   the bus monitor unit is connected via an interface to a communications computer of the central node, which loads or calculates the time patterns.

5. The apparatus according to claim 4, wherein the timing means is periodically triggerable according to said time patterns.

6. The apparatus according to claim 1, wherein the timing means has a watchdog which checks cyclical synchronization of the timing means according to said time patterns, and provides a fault message when it fails to occur.

7. The apparatus according to claim 6, wherein the watchdog blocks the bus monitor unit when there is a fault message relating to intervention into the bus communication.

8. The apparatus according to claim 1, wherein the central bus node comprises a star coupler of a data bus having one of a star shape and a cascaded star shape.

9. The apparatus according to claim 1, wherein the blocking of communication is performed during one of an initialization and cyclically during operation.

10. A central node for a data bus system having a bus monitor unit with receiver means for registering signals on the data bus, and evaluation means for at least temporarily blocking communication by a bus user that causes faulty communication on the bus, or for compensating a faulty communication that is triggered by interference influences, wherein:
   the bus monitor unit has timing means which are triggered accordance to time patterns for transmission by each user of the data bus, to detect a faulty communication of a particular user if the particular user transmits outside a time provided for it;
   the bus monitor unit is integrated into the central node;
   a plurality of bus branches of different users are combined at the central node, so that the bus monitor unit can check a plurality of users for incorrect communication; and
   in addition to the bus monitor unit, the central node includes a diagnostic unit integrated therein, said diagnostic unit monitoring regularity of retriggering of the bus monitor unit according to the time patterns, whereby the bus monitor unit can be deactivated in the absence of retriggering; and
   the diagnostic unit includes means for intermittently switching the bus monitor from an active state to an inactive state in particular time periods, to permit asynchronous communication on the data bus during such time periods.

11. The apparatus according to claim 10, wherein:
the diagnostic unit includes a watchdog which is connected to the timing means, and to which signals for regular retriggering of the bus monitor unit are fed; and
the watchdog is connected via a control line to the bus monitor unit and blocks its operation in the absence of retriggering.

12. The apparatus according to claim 10, wherein the bus monitor is integrated in a node computer housing, together with the central node and the diagnostic unit.

13. The apparatus according to claim 10, wherein the bus monitor unit is connected via an interface to a communications computer of the central node, which loads or calculates the time patterns.

14. The apparatus according to claim 10, wherein the timing means has a watchdog which checks cyclical synchronization of the timing means according to said time patterns, and provides a fault message when it fails to occur.

15. A data bus system comprising a node that includes a star coupler by which branches of said data bus system are connected in a star configuration, a bus monitor unit with receiver means for registering signals on the data bus system, and evaluation means for at least temporarily blocking communication by a bus user of said system that causes faulty communication on the bus, or for compensating a faulty communication that is triggered by interference influences, wherein:
said central node is in the form of a gateway at which bus branches of at least two different data bus systems converge;
the bus monitor unit has timing means which are triggered according to time patterns for transmission by each user of said at least two different data bus systems, to detect and block a faulty communication of a particular user if the particular user transmits outside a time provided for it;
the bus monitor unit is integrated into a central node;
a plurality of said branches which are connected to different users are combined at said central node via said star coupler, so that the bus monitor unit can check said plurality of users for incorrect communication; and
in addition to the bus monitor unit, a diagnostic unit is integrated into the central node, said diagnostic unit monitoring regularity of retriggering of the bus monitor unit according to the time patterns, whereby the bus monitor unit can be deactivated in the absence of retriggering.

16. The apparatus according to claim 15, wherein:
the diagnostic unit includes a watchdog which is connected to the timing means, and to which signals for regular retriggering of the bus monitor unit are fed; and
the watchdog is connected via a control line to the bus monitor unit and blocks its operation in the absence of retriggering.

17. The apparatus according to claim 15, wherein the bus monitor is integrated in a node computer housing, together with the central node and the diagnostic unit.

18. The apparatus according to claim 15, wherein the bus monitor unit is connected via an interface to a communications computer of the central node, which loads or calculates the time patterns.

19. The apparatus according to claim 15, wherein the timing means has a watchdog which checks cyclical synchronization of the timing means according to said time patterns, and provides a fault message when it fails to occur.

* * * * *